(12) United States Patent
Park

(10) Patent No.: US 10,138,982 B2
(45) Date of Patent: Nov. 27, 2018

(54) AUTONOMOUS HYDRAULIC EXPANSION AND CONTRACTION APPARATUS

(71) Applicant: Jong Bok Park, Seoul (KR)

(72) Inventor: Jong Bok Park, Seoul (KR)

( * ) Notice: Subject to any disclaimer, the term of this patent is extended or adjusted under 35 U.S.C. 154(b) by 27 days.

(21) Appl. No.: 15/522,719

(22) PCT Filed: Oct. 8, 2015

(86) PCT No.: PCT/KR2015/010644
§ 371 (c)(1),
(2) Date: Apr. 27, 2017

(87) PCT Pub. No.: WO2016/068510
PCT Pub. Date: May 6, 2016

(65) Prior Publication Data
US 2017/0328445 A1 Nov. 16, 2017

(30) Foreign Application Priority Data

Oct. 30, 2014 (KR) ........................ 10-2014-0149389

(51) Int. Cl.
| | |
|---|---|
| *F16G 11/00* | (2006.01) |
| *F16G 11/12* | (2006.01) |
| *F16F 5/00* | (2006.01) |
| *F16H 7/12* | (2006.01) |
| *F15B 15/14* | (2006.01) |
| *A01B 63/111* | (2006.01) |

(Continued)

(52) U.S. Cl.
CPC ............ *F16G 11/12* (2013.01); *F15B 15/149* (2013.01); *F16F 5/00* (2013.01); *F16H 7/1236* (2013.01); *A01B 63/111* (2013.01); *A01B 63/112* (2013.01); *F16H 2007/0859* (2013.01); *F16H 2007/0891* (2013.01)

(58) Field of Classification Search
CPC .... F15B 15/149; F15B 15/1438; F16G 11/12; F16H 7/1236
See application file for complete search history.

(56) References Cited

U.S. PATENT DOCUMENTS

| | | | | |
|---|---|---|---|---|
| 2,209,885 A | * | 7/1940 | Hall ........................ | F15B 15/18 254/29 R |
| 3,314,657 A | * | 4/1967 | Prud homme .......... | F16G 11/12 254/392 |

(Continued)

FOREIGN PATENT DOCUMENTS

| | | |
|---|---|---|
| KR | 14199569 | 7/2002 |
| KR | 1005919740000 | 4/2006 |

(Continued)

*Primary Examiner* — Emmanuel M Marcelo
(74) *Attorney, Agent, or Firm* — IPLA P.A.; James E. Bame

(57) ABSTRACT

An autonomous hydraulic expansion and contraction apparatus comprises a fixing unit, a cylinder unit, a support unit, a piston unit, a valve unit and oil supply parts. By controlling the expansion and contraction length of the support part by a simple manipulation of the valve part by moving the lever, the autonomous hydraulic expansion and contraction apparatus can be easily expanded and contracted to the combined length of the expansion and contraction equipment, and additionally, the convenience of use can be enhanced.

2 Claims, 8 Drawing Sheets

(51) Int. Cl.
    *A01B 63/112*    (2006.01)
    *F16H 7/08*     (2006.01)

(56)            References Cited

U.S. PATENT DOCUMENTS 3,717,070  A  *   2/1973  Paul .................... F15B 15/1438
                                                              92/128
    4,706,343  A  *  11/1987  Neidigk ................ B60P 7/0823
                                                             24/68 CD
    4,708,697  A  *  11/1987  Foster ................... F16H 7/1236
                                                              474/135
 2013/0105658  A1 *   5/2013  Hisel ........................ B66F 3/25
                                                              248/352
 2015/0159753  A1 *   6/2015  Mueller .............. F15B 15/1438
                                                              92/165 R

FOREIGN PATENT DOCUMENTS

KR      1005919740000       6/2006
    KR      1020070016783       2/2007
    KR           20298135      12/2008
    KR      1020110120969      11/2011

* cited by examiner

AUTONOMOUS HYDRAULIC EXPANSION AND CONTRACTION APPARATUS

BACKGROUND

The present invention relates to an autonomous hydraulic expansion and contraction apparatus, and more particularly to an autonomous hydraulic expansion and contraction apparatus configured such that the expansion and contraction length of a support unit is expanded and contracted to the coupling length of the expansion and contraction equipment by simple manipulation of a valve unit and such that oil replenishment is rapidly achieved.

In general, a turnbuckle is typically used as an apparatus for expanding and contracting shafts of various kinds of machines and an apparatus for controlling the tensile force of construction equipment.

The turnbuckle is an apparatus for pulling and tightening a rope, a chain, a wire, etc. The turnbuckle is provided at the left and right sides thereof with screw bars. One of the male screws is a right-handed screw, and the other of the male screws is a left-handed screw. When members having female screws, such as nuts, are rotated in one direction, the two male screws approach each other. When the nuts are rotated in the opposite direction, the two male screws are moved away from each other.

When a support bar, a support steel rope, a steel bar, a rope, etc. of a structure is tightly pulled using the above operating process, the turnbuckle is disposed in the middle of it such that the turnbuckle is rotated to tightly pull it, thereby controlling the tensile force of it.

The structure of a turnbuckle, which is a typical example of the above expansion and contraction apparatus, will be described with reference to FIGS. 1 and 2.

In a turnbuckle, which is configured to achieve axial connection such that a coupling length is adjustable between opposite coaxial rod members that are expansible and contractible, female parts 11 and 12, to which male type rod members 21 and 22 are coupled, are formed in the ends of a female type tubular sleeve 10, one of the ends of the sleeve and a corresponding one of the rods coupled thereto are provided with left-handed screws, and the other of the ends of the sleeve and another corresponding one of the rods coupled thereto are provided with right-handed screws.

When the sleeve 10 is rotated, the rods 21 and 22 are introduced into the sleeve 10 or are withdrawn from the sleeve 10 depending on the direction in which the sleeve 10 is rotated. After a required axial distance is achieved between the two rods 21 and 22, the turnbuckle is fastened using a fastening member.

The turnbuckle is formed by casting or forging. When a support bar, a support steel rope, a steel bar, a rope, etc. of a structure is tightly pulled, the turnbuckle is disposed in the middle of it such that the turnbuckle is rotated to tightly pull it.

In the turnbuckle, which is generated used as the expansion and contraction apparatus, as described above, screws having corresponding directions are formed in the ends of the opposite coaxial rods and the inside of the sleeve such that the corresponding screws interact with each other via the rotation of the sleeve to adjust the coupling length therebetween. In order to adjust the length, it is necessary to continuously rotate the sleeve, to which the screws are coupled, with the result that much time and cost are needed.

In addition, in the conventional turnbuckle, the coaxial rods, which have screws corresponding to the screws formed in the sleeve, are screw-coupled to the sleeve such that coupling length is adjusted by the rotation of the sleeve. Since the length is adjusted by the movement of the coaxial rods in response to the rotation of the screws, a backlash phenomenon occurs due to the gap in the coupling space between the screw threads. As a result, the expansion and contraction length is changed by a predetermined distance depending on variation in displacement after the adjustment of the length.

Furthermore, in the conventional turnbuckle, when the turnbuckle is moved in the state in which the opposite coaxial rods are screw-coupled to the middle sleeve so as to adjust the length, the coupled screws are rotated and unfastened, with the result that it is not possible to maintain the expansion and contraction length uniform.

In addition, the conventional turnbuckle is configured to be expansible when the turnbuckle is rotated in one direction and to be contractible when the turnbuckle is rotated in the opposite direction since the screws formed in corresponding directions are coupled to each other. Consequently, the expansion and contraction strength that the screw threads can withstand is limited, whereby it is difficult to use a turnbuckle using screws if more than a predetermined capacity is required.

SUMMARY OF THE INVENTION

Therefore, the present invention has been made in view of the above problems, and it is an object of the present invention to provide an autonomous hydraulic expansion and contraction apparatus configured such that the expansion and contraction length of a support unit is adjusted by simple manipulation of a valve unit in response to the operation of a lever, whereby the autonomous hydraulic expansion and contraction apparatus is easily expandable and contractible to the coupling length of expansion and contraction equipment.

It is another object of the present invention to provide an autonomous hydraulic expansion and contraction apparatus configured such that an inclined guide surface and an inclined support surface are formed at a portion at which a cylinder unit and connection members are connected to each other so as to reduce the load transmitted to the connection portion when oil moves and such that oil is stored in the cylinder unit and the connection members so as to withstand a high load of expansion and contraction equipment.

It is another object of the present invention to provide an autonomous hydraulic expansion and contraction apparatus configured such that expansion and contraction can be more easily and rapidly achieved through a cylinder unit, connection members, and a valve unit than when using a conventional hydraulic expansion and contraction apparatus.

It is a further object of the present invention to provide an autonomous hydraulic expansion and contraction apparatus configured such that oil can be replenished in real time as needed while oil is rapidly supplied into a receiving space in a cylinder unit through oil supply parts formed in upper and lower connection members.

In accordance with the present invention, the above and other objects can be accomplished by the provision of an autonomous hydraulic expansion and contraction apparatus including a fixing unit having a fixing support member formed at the end of the lower part thereof, a cylinder unit mounted to the upper part of the fixing unit, the cylinder unit being provided therein with a receiving space for storing oil, a support unit, one side of which is inserted and mounted into the receiving space in the cylinder unit and the other side of which is located outside the cylinder unit, an expansion and contraction fixing member being mounted to the end of the other side of the support unit, the support unit being configured to move upward or downward in response to the movement of the oil stored in the receiving space, a piston unit including a barrier type sealing part mounted to the end of the support unit, which is inserted into the receiving space, the barrier type sealing part being configured to move in response to the movement of the support unit, a valve unit disposed at the outer surface of the cylinder unit, the valve unit being provided at the upper and lower parts thereof with upper and lower connection members, which communicate with the cylinder unit, a vertical connection member being mounted to the ends of the upper and lower connection members, a valve having a value mounting hole for allowing or interrupting communication between the lower connection member and the vertical connection member in response to the manipulation of a lever being mounted in the connection portion of the connection members, and oil supply parts mounted to the ends of the upper and lower connection members for supplying oil into the cylinder unit.

The upper and lower connection members may be coupled to the cylinder unit through cylinder coupling holes, each of the cylinder coupling holes having an inclined guide surface and an inclined support surface for allowing the smooth movement of oil and preventing concentration of a load during the movement of the oil, the inclined guide surface and the inclined support surface having different angles of inclination.

In addition, at least one auxiliary valve for preventing an overload from being applied to the valve unit may be selectively mounted in the lower connection member.

According to embodiments of the present invention, the present invention has the effect of providing an autonomous hydraulic expansion and contraction apparatus configured such that the expansion and contraction length of a support unit is adjusted by simple manipulation of a valve unit in response to the operation of a lever, whereby the autonomous hydraulic expansion and contraction apparatus is easily expandable and contractible to the coupling length of expansion and contraction equipment and the convenience of use is improved.

In addition, the present invention has the effect of providing an autonomous hydraulic expansion and contraction apparatus configured such that an inclined guide surface and an inclined support surface are formed at a portion at which a cylinder unit and connection members are connected to each other so as to reduce the load transmitted to the connection portion when oil moves, thereby preventing damage to the connection portion, and such that oil is stored in the cylinder unit and the connection members so as to withstand a high load of expansion and contraction equipment, whereby the autonomous hydraulic expansion and contraction apparatus is usable in various forms.

In addition, the present invention has the effect of providing an autonomous hydraulic expansion and contraction apparatus configured such that expansion and contraction can be more easily and rapidly achieved through a cylinder unit, connection members, and a valve unit than when using a conventional hydraulic expansion and contraction apparatus, thereby achieving easy control together with accurate operation.

In addition, the present invention has the effect of providing an autonomous hydraulic expansion and contraction apparatus configured such that oil can be replenished in real time as needed while oil is rapidly supplied into a receiving space in a cylinder unit through oil supply parts formed in upper and lower connection members, whereby the autonomous hydraulic expansion and contraction apparatus can be semi-permanently used. Furthermore, the present invention has the effect of providing an autonomous hydraulic expansion and contraction apparatus including two oil supply parts such that, when oil is supplied through one of the oil supply parts, air is discharged from a cylinder unit through the other of the oil supply parts, thereby improving productivity.

DETAILED DESCRIPTION OF THE INVENTION

Now, preferred embodiments of the present invention will be described in detail with reference to the accompanying drawings so that the present invention can be easily realized by those ordinarily skilled in the art to which the present invention pertains. However, the present invention may be realized in various different forms, and therefore the present invention is not limited to the following embodiments. The same reference numbers will be used throughout this specification to refer to the same or like parts.

Figure 1:
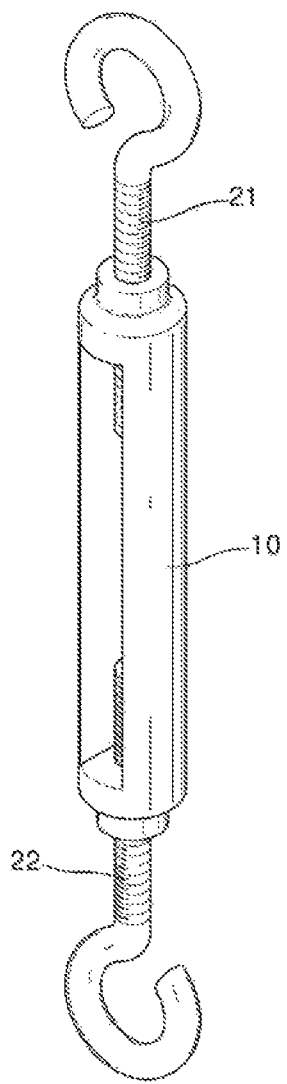
FIGS. 1 and 2 are a perspective view and a sectional view showing a conventional turnbuckle.
Figure 2:
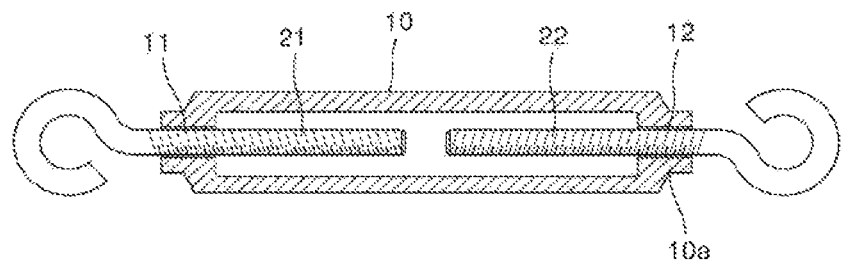
Figure 3:
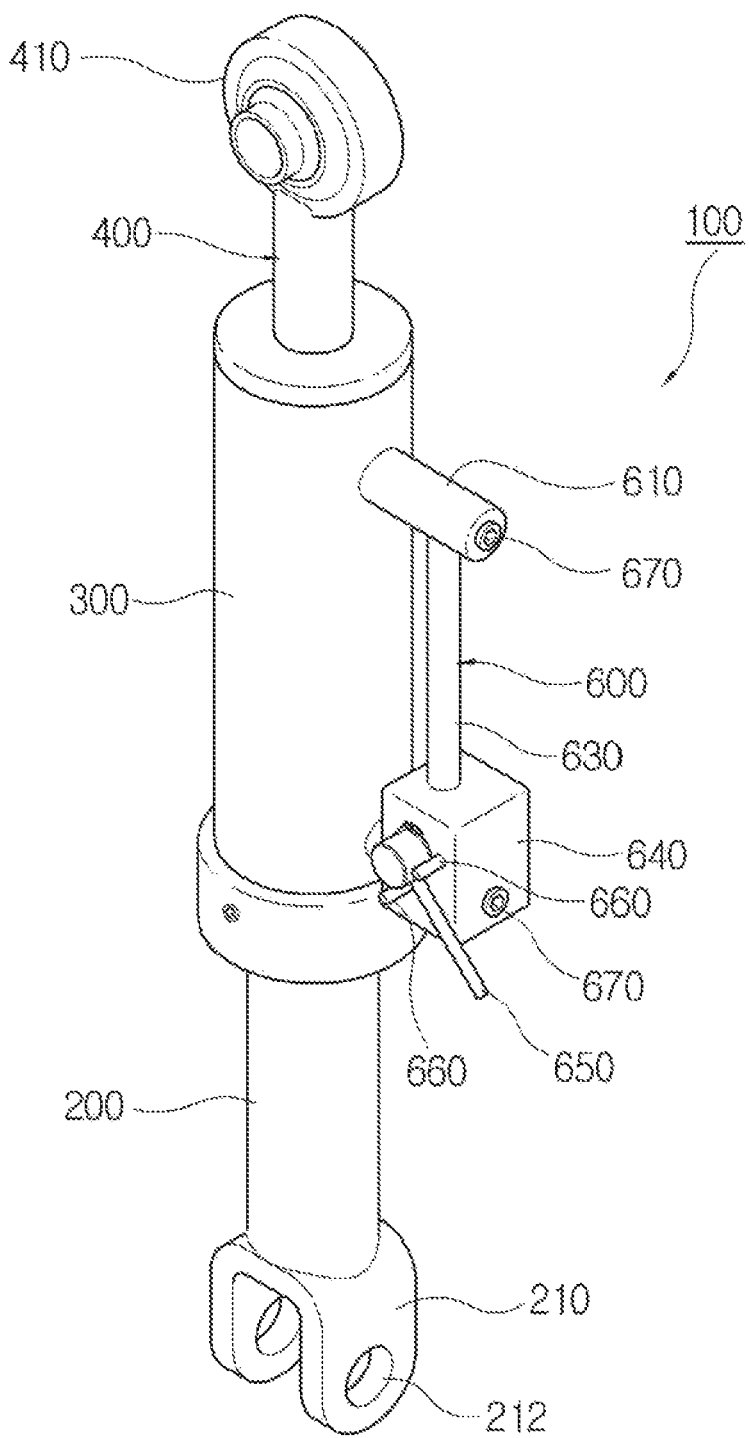
FIG. 3 is a perspective view showing an autonomous hydraulic expansion and contraction apparatus according to the present invention.
Figure 4:
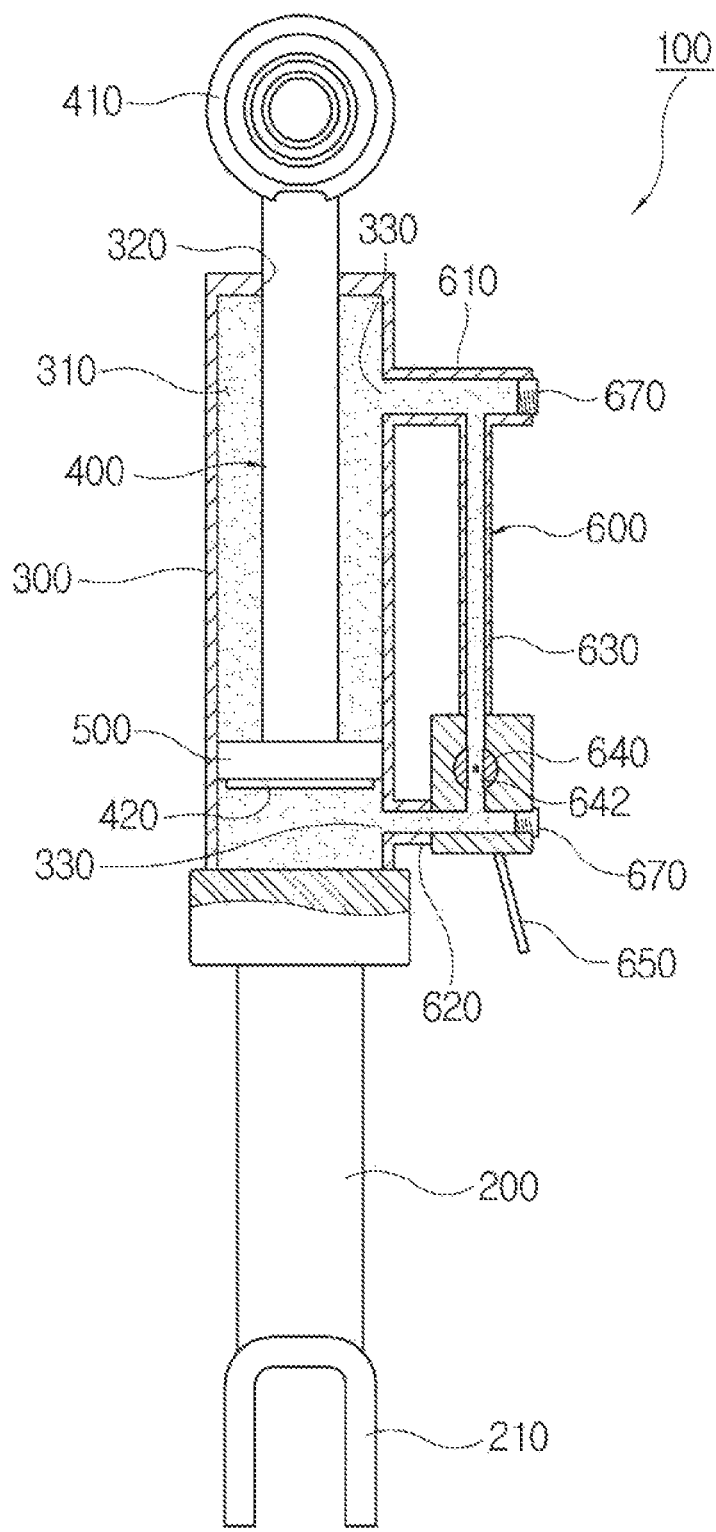
FIG. 4 is a partial sectional view showing the autonomous hydraulic expansion and contraction apparatus according to the present invention.
Figure 5:
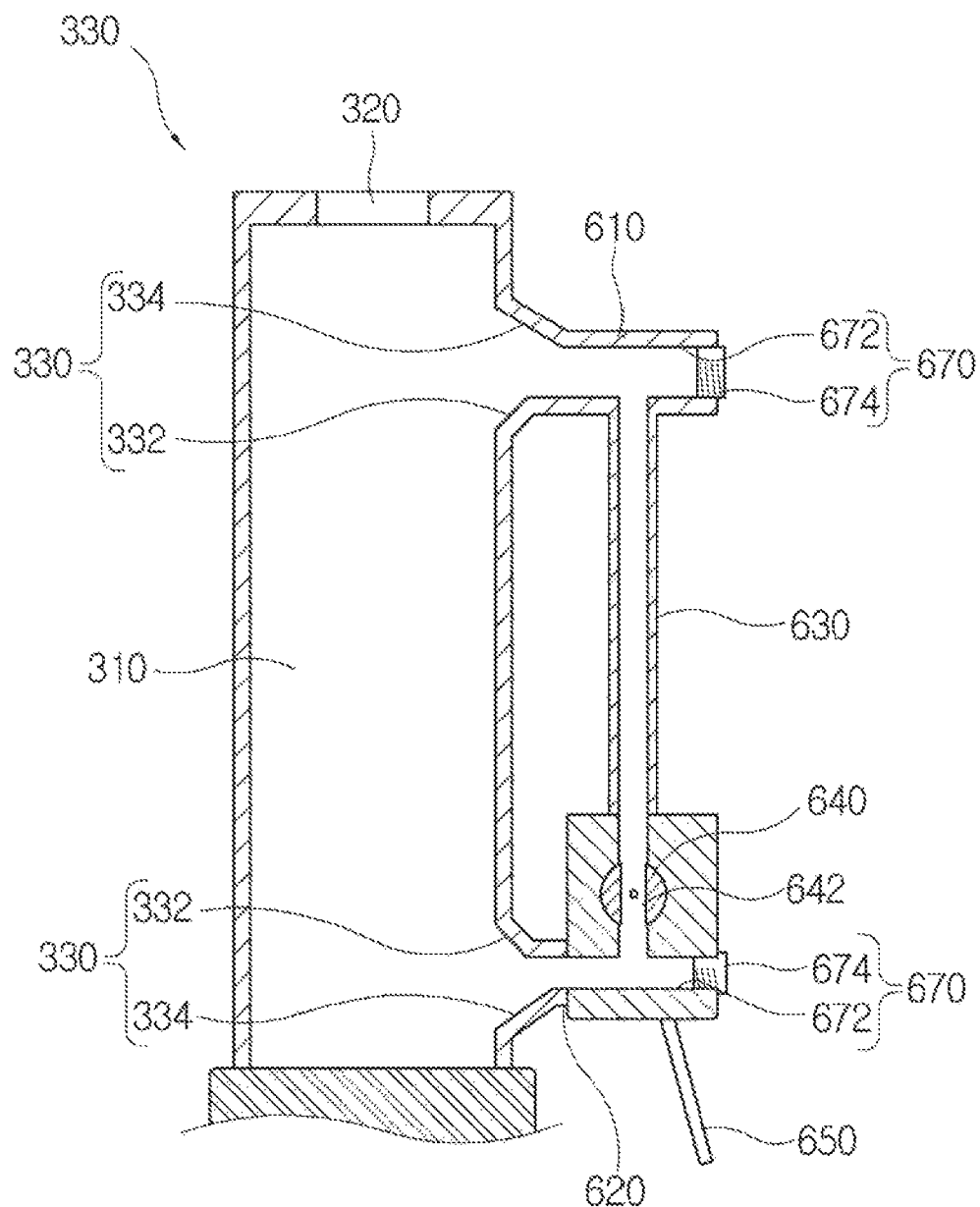
FIG. 5 is a partially enlarged sectional view showing another embodiment of a cylinder unit and a valve unit constituting the autonomous hydraulic expansion and contraction apparatus according to the present invention.
Figure 6:
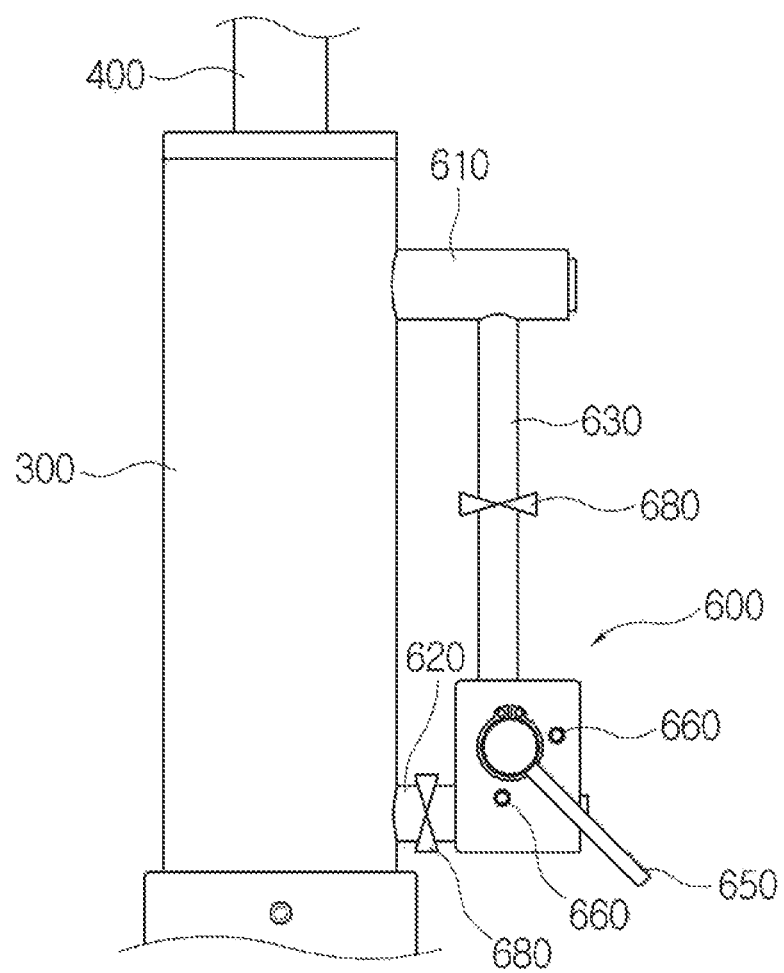
FIG. 6 is a partially enlarged view showing a further embodiment of the cylinder unit and the valve unit constituting the autonomous hydraulic expansion and contraction apparatus according to the present invention.
Figure 7:
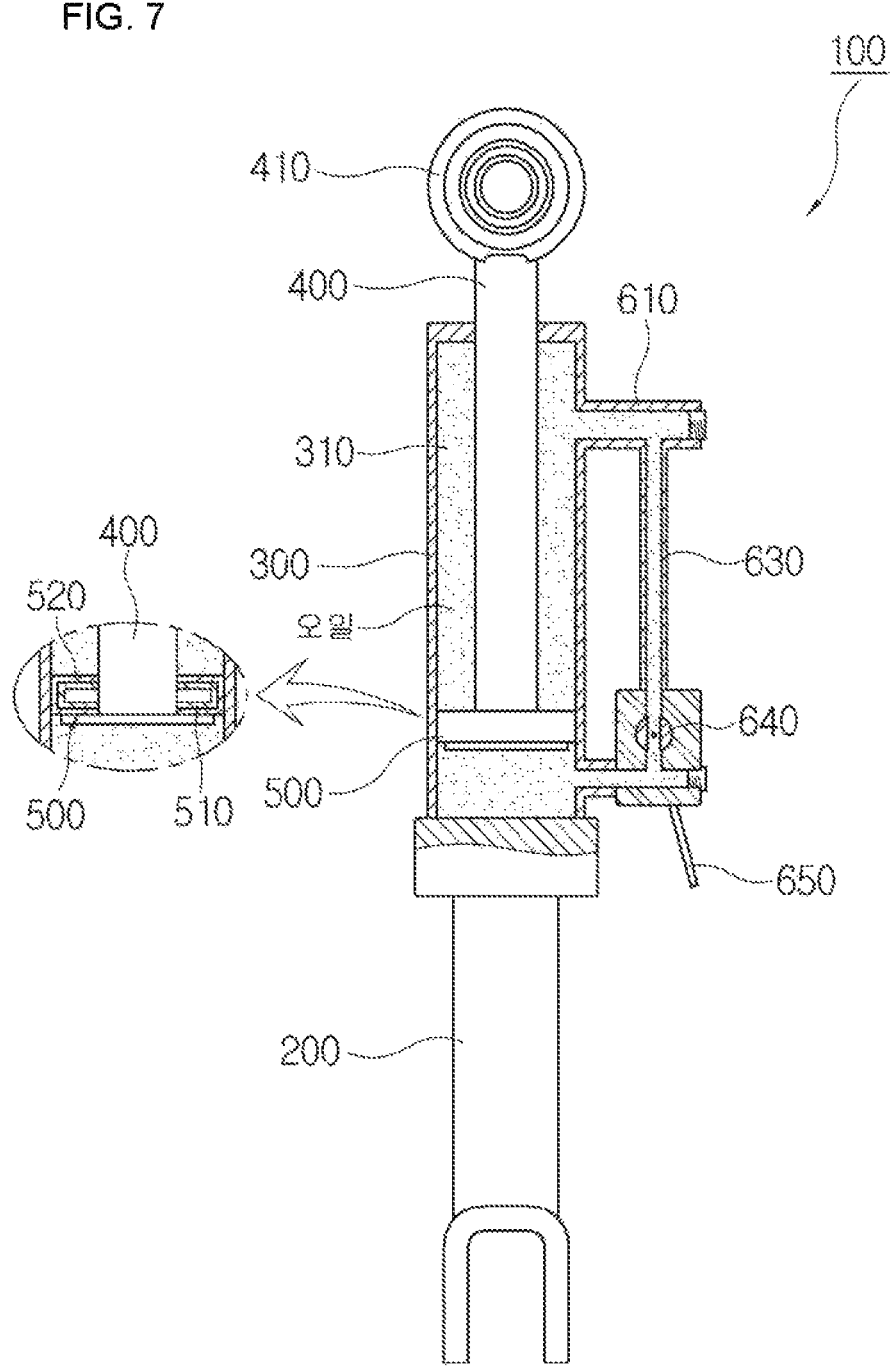
FIGS. 7 to 9 are views showing the operation of the autonomous hydraulic expansion and contraction apparatus according to the present invention.
Figure 8:
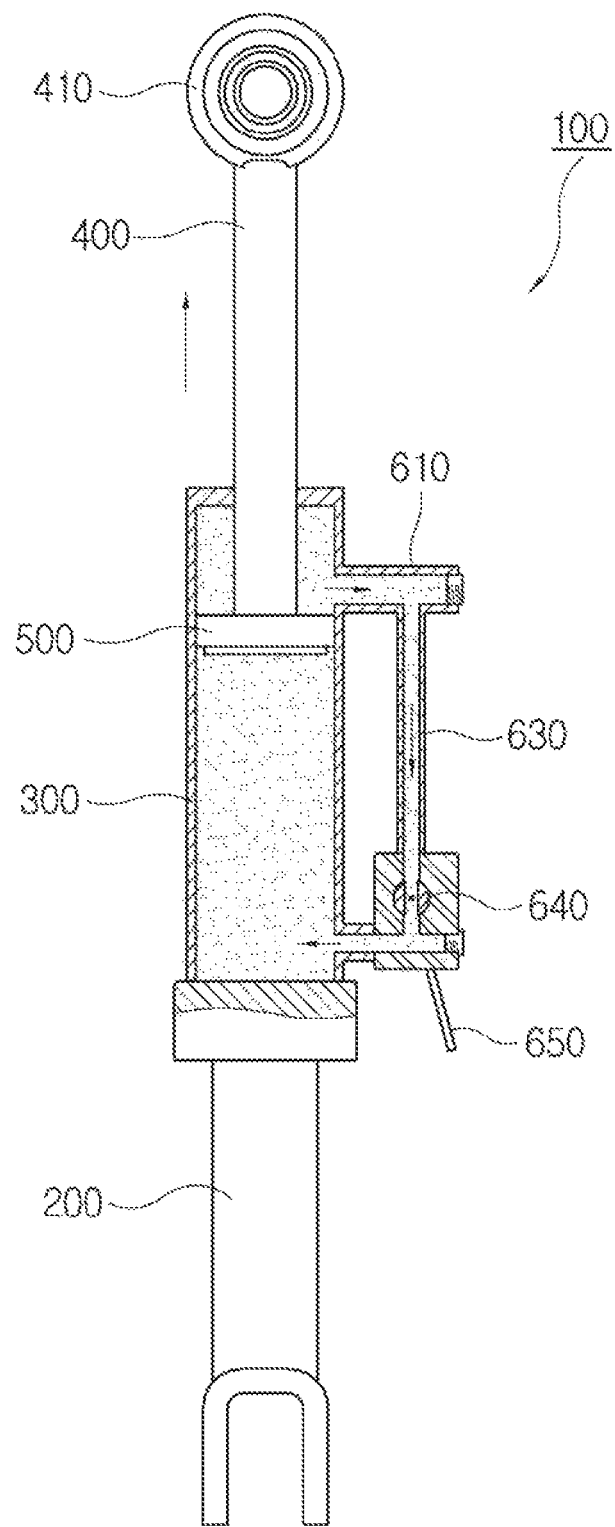
Figure 9:
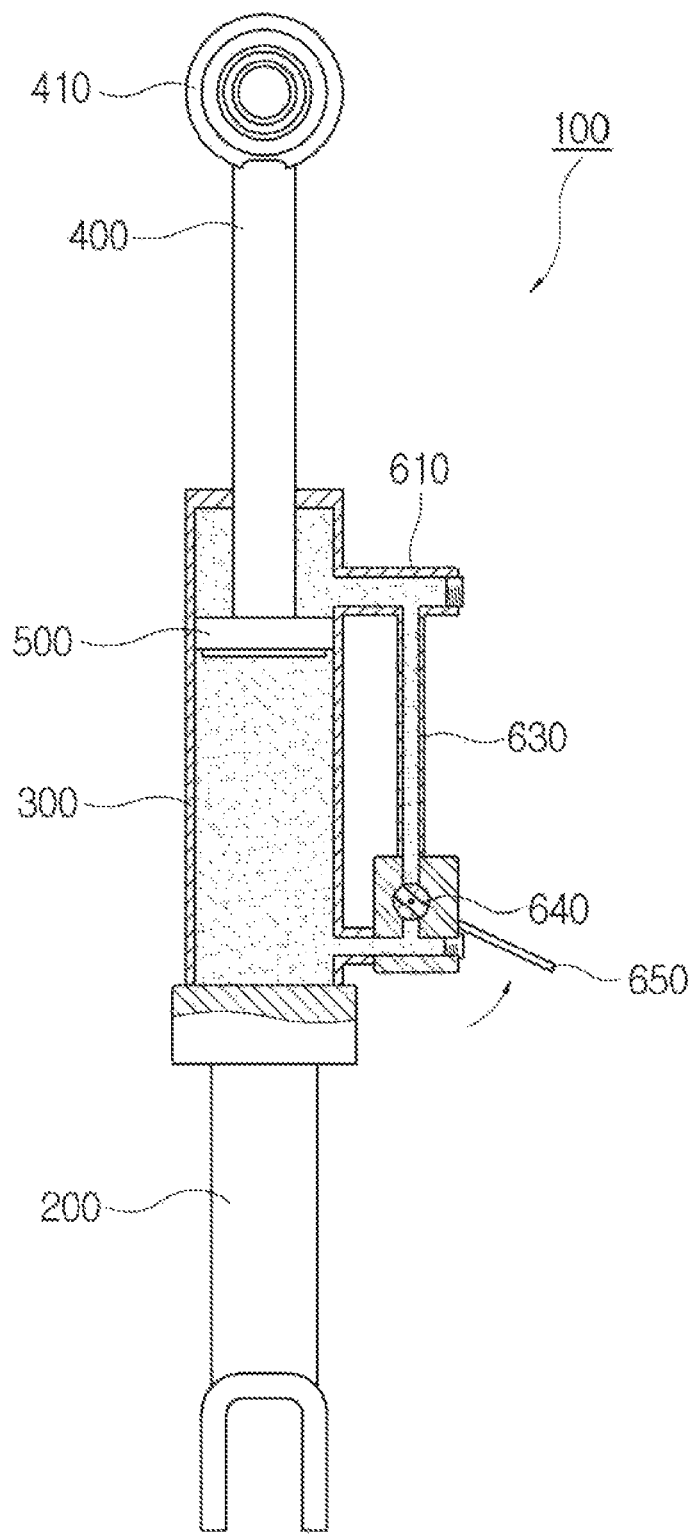

Hereinafter, the construction of the present invention will be described with reference to the accompanying drawings, wherein FIG. 3 is a perspective view showing an autonomous hydraulic expansion and contraction apparatus according to the present invention, FIG. 4 is a partial sectional view showing the autonomous hydraulic expansion and contraction apparatus according to the present invention, FIG. 5 is a partially enlarged sectional view showing another embodiment of a cylinder unit and a valve unit constituting the autonomous hydraulic expansion and contraction apparatus according to the present invention, and FIG. 6 is a partially enlarged view showing a further embodiment of the cylinder unit and the valve unit constituting the autonomous hydraulic expansion and contraction apparatus according to the present invention.

An autonomous hydraulic expansion and contraction apparatus 100 according to the present invention includes a fixing unit 200, a cylinder unit 300 mounted to the upper part of the fixing unit 200, a support unit 400 mounted to the upper part of the cylinder unit 300 so as to be movable upward and downward, a piston unit 500 including a barrier type sealing part mounted to the end of the support unit 400 located in the cylinder unit 300, and a valve unit 600 disposed at the outer surface of the cylinder unit 300 for moving oil stored in the cylinder unit 300 upward and downward in response to the operation of the support unit 400.

The fixing unit 200 is formed in the shape of a cylinder having a predetermined height and diameter, and a fixing support member 210, which is connected to expansion and contraction equipment, is formed at the end of the lower part of the fixing unit 200.

That is, the fixing unit 200 is configured such that the fixing support member 210 is integrally formed at the lower part of a cylinder having a predetermined height and diameter so as to be connected to the expansion and contraction equipment.

The fixing unit 200 may be formed so as to have various sectional shapes in addition to the cylinder. The fixing support member 210 is formed in the sectional shape of an inverted U so as to increase the coupling force with the expansion and contraction equipment. In addition, the fixing support member 210 is provided in opposite sides thereof with coupling holes 212.

The cylinder unit 300, which is mounted to the upper part of the fixing unit 200, is formed in the shape of a cylinder having a predetermined height and diameter. The cylinder unit 300 is provided therein with a receiving space 310 for storing oil, and a support unit through hole 320 is formed in the upper part of the cylinder unit 300.

That is, the cylinder unit 300, which is formed in the shape of a cylinder having a predetermined height and diameter, is integrally formed at the upper part of the fixing unit 200. The receiving space 310 for storing oil is defined in the cylinder unit 300, and the support unit through hole 320 is formed in the center of the upper part of the cylinder unit 300.

The cylinder unit 300 is provided in the upper and lower parts thereof with cylinder coupling holes 330, through which oil is supplied to the cylinder unit 300 using the valve unit 600.

That is, the cylinder coupling holes 330 in the cylinder unit 300 are configured to move oil upward and downward using the valve unit 600 at the time of operation of the piston unit 500, including the barrier type sealing part, in response to the operation of the support unit 400.

Each of the cylinder coupling holes 330 has an inclined guide surface 332 and an inclined support surface 334 for allowing the smooth movement of oil located in the upper and lower parts of the receiving space 310 and preventing concentration of a load during the movement of the oil. The inclined guide surface 332 and the inclined support surface 334 have different angles of inclination.

More specifically speaking, each of the cylinder coupling holes 330 is configured to guide the oil stored in the receiving space 310 to a transmission member using the angles of inclination of the inclined guide surface 332 and the inclined support surface 334 and to guide a large amount of oil to the transmission member using the inclined support surface 334, which is formed so as to have a smaller angle than the inclined guide surface 332.

One side of the support unit 400, which is disposed at the upper part of the cylinder unit 300, is inserted and mounted into the receiving space 310 in the cylinder unit 300, and the other side of the support unit 400 is located outside the cylinder unit 300. An expansion and contraction fixing member 410 is mounted to the end of the other side of the support unit 400.

That is, the support unit 400 is configured to move upward or downward in response to the movement of the oil stored in the receiving space 310, and the expansion and contraction fixing member 410, which is connected to the expansion and contraction equipment, is mounted to the end of the outer side of the support unit 400.

A step 420 for smooth coupling with the piston unit 500, including the barrier type sealing part, may be formed at the end of the support unit 400 opposite the expansion and contraction fixing member 410.

The piston unit 500, including the barrier type sealing part mounted to the end of the support unit 400 located in the cylinder unit 300, includes a barrier type piston 510 and a sealing part 520 mounted to the outside of the piston 510.

That is, the piston unit 500, including the barrier type sealing part, is mounted to the step 420, which is located in the receiving space 310 in the cylinder unit 300, so as to move oil downward or upward in response to the movement of the support unit 400.

A well-known piston may be selectively used instead of the piston unit 500 including the barrier type sealing part shown in the drawings.

The valve unit 600, which is disposed at the outer surface of the cylinder unit 300, is provided at the upper and lower parts thereof with upper and lower connection members 610 and 620, which communicate with the cylinder unit 300. A vertical connection member 630 is communicably mounted to the ends of the upper and lower connection members 610 and 620. A valve 640 having a value mounting hole 642 for allowing or interrupting communication between the lower connection member 620 and the vertical connection member 630 in response to the manipulation of a lever 650 is mounted in the connection portion of the connection members 620 and 630.

In the present invention, the upper connection member 610 and the lower connection member 620 of the valve unit 600 are horizontally communicably mounted to the cylinder coupling holes 330, which are formed in the upper and lower parts of the cylinder unit 300, the vertical connection member 630 is communicably mounted between the upper and lower connection members 610 and 620, and the valve 640 having the value mounting hole 642, which is configured to communicate with the lower connection member 620 in response to the manipulation of the lever 650, is mounted in the connection portion of the lower connection member 620 and the vertical connection member 630.

That is, the valve unit 600 is configured such that the upper and lower connection members 610 and 620 are connected to the cylinder coupling holes 330, which are located in the upper and lower parts of the cylinder unit 300, the vertical connection member 630 is connected to the upper and lower connection members 610 and 620, and the valve 640, which is provided with the lever 650, is mounted in the connection portion of the lower connection member 620 and the vertical connection member 630.

The valve 640 is configured to circulate oil transmitted through the upper and lower connection members 610 and 620 or interrupt the movement of the oil in response to the operation of the lever 650.

Furthermore, stoppers 660 are mounted to the outer surface of the valve 640 at predetermined intervals so as to limit the operating range of the lever 650.

In addition, oil supply parts 670 for supplying oil into the cylinder unit 300 or discharging the oil from the cylinder unit 300 are mounted to the ends of the upper and lower connection members 610 and 620.

Each of the oil supply parts 670 includes an oil supply hole 672 formed in the end of a corresponding one of the upper and lower connection members 610 and 620 and an oil supply hole closure member 674 for blocking or opening the oil supply hole 672. Consequently, the oil supply parts 670 may supply oil into the receiving space 310 in the cylinder unit 300 or may discharge the oil from the receiving space 310 in the cylinder unit 300.

The reason that the oil supply parts 670 are formed in the upper and lower connection members 610 and 620 is that it is necessary to discharge air from the receiving space 310 in the cylinder unit 300 and from the connection members 610, 620, and 630 by opening one of the oil supply parts 670 when oil is supplied through the other of the oil supply parts 670 such that the oil can be rapidly supplied into the receiving space 310 in the cylinder unit 300 and into the connection members 610, 620, and 630.

Furthermore, the oil supply parts 670 serve to replenish the receiving space 310 in the cylinder unit 300 with oil. That is, the oil supply parts 670 replenish oil discharged to the outside in response to the forward and rearward movement of the support unit 400 such that the autonomous hydraulic expansion and contraction apparatus 100 can be semi-permanently used, whereby it is possible to improve productivity in producing products.

In addition, auxiliary valves 680 are selectively mounted in the connection members 610, 620, and 630 to prevent an overload from being applied to the valve 640 when oil moves through the valve 640.

That is, the auxiliary valves 680 are selectively mounted in the connection members 610, 620, and 630. In the case in which the pressure applied to the valve 640 is greater than a predetermined value, the auxiliary valves 680 close the interiors of the connection members 610, 620, and 630 to prevent the movement of oil. On the other hand, in the case in which the pressure applied to the valve 640 is less than the predetermined value, the auxiliary valves 680 open the interiors of the connection members 610, 620, and 630 to allow the movement of oil.

In order to measure the pressure in the valve 640, pressure gauges of a well-known type may be connected to the auxiliary valves 680.

Hereinafter, the process of assembling the autonomous hydraulic expansion and contraction apparatus having the above-stated construction will be described.

First, a fixing unit 200 is formed in the shape of a cylinder having a predetermined height and diameter, and a fixing support member 210, which is configured to be connected to expansion and contraction equipment, is formed at the end of the lower part of the fixing unit 200.

Subsequently, a cylinder unit 300 is mounted to the upper part of the fixing unit 200. The cylinder unit 300 is formed in the shape of a cylinder having a predetermined height and diameter. The cylinder unit 300 is provided therein with a receiving space 310 for storing oil, and a support unit through hole 320 is formed in the upper part of the cylinder unit 300. The cylinder unit 300 is provided in the upper and lower parts thereof with cylinder coupling holes 330, which are configured to communicate with a transmission member of a valve unit 600.

Subsequently, a support unit 400, which is formed in the shape of a cylinder having a predetermined height and diameter, is mounted to the cylinder unit 300. One side of the support unit 400, in which a step 420 is formed, is inserted into the receiving space 310 of the cylinder unit 300, and the other side of the support unit 400 is located outside the cylinder unit 300. An expansion and contraction fixing member 410 is mounted to the end of the other side of the support unit 400.

A piston unit 500 including a barrier type sealing part, which is made of rubber or synthetic resin and which is configured to be movable in the state in which the outer surface of the barrier type sealing part is in tight contact with the inner surface of the cylinder unit 300, is mounted to the step 420 of the support unit 400.

Subsequently, a valve unit 600 is mounted to the outer surface of the cylinder unit 300. The valve unit 600 is provided at the upper and lower parts thereof with upper and lower connection members 610 and 620, which communicate with the cylinder unit 300. A vertical connection member 630 is communicably mounted to the ends of the upper and lower connection members 610 and 620. A valve 640 having a value mounting hole 642 for allowing or interrupting communication between the lower connection member 620 and the vertical connection member 630 in response to the manipulation of a lever 650 is mounted in the connection portion of the connection members 620 and 630. Oil supply parts 670 for supplying oil into the cylinder unit 300 or discharging the oil from the cylinder unit 300 are mounted to the ends of the upper and lower connection members 610 and 620. As a result, the assembly of the autonomous hydraulic expansion and contraction apparatus 100 is completed.

The sequence in which the autonomous hydraulic expansion and contraction apparatus is assembled may be different from the above sequence.

Hereinafter, the operation of the autonomous hydraulic expansion and contraction apparatus having the above-stated construction will be described.

First, oil is supplied into the receiving space 310 in the cylinder unit 300 and into the connection members 610, 620, and 630 using the oil supply parts 670, which are mounted to the upper and lower connection members 610 and 620 constituting the autonomous hydraulic expansion and contraction apparatus 100.

When oil is supplied through one of the oil supply parts 670, the other of the oil supply parts 670 is opened to discharge air from the receiving space 310 in the cylinder unit 300 and from the connection members 610, 620, and 630 such that the oil can be rapidly supplied into the receiving space 310 in the cylinder unit 300 and into the connection members 610, 620, and 630.

The autonomous hydraulic expansion and contraction apparatus 100 is moved to expansion and contraction equipment, the fixing support member 210, which is formed at the end of the fixing unit 200, is fixed and coupled to the expansion and contraction equipment, and the lever 650 of the valve unit 600 is operated such that the value mounting hole 642 of the valve 640 communicates with the lower connection member 620 and the vertical connection member 630.

Subsequently, the support unit 400, which is coupled to the cylinder unit 300, is extended to the connection portion of the expansion and contraction equipment, and the expansion and contraction fixing member 410, which is mounted to the end of the upper part of the support unit 400, is connected to the expansion and contraction equipment.

At this time, oil stored in a portion of the receiving space 310 of the cylinder unit 300 that is defined above the piston 500 moves into a portion of the receiving space 310 of the cylinder unit 300 that is defined under the piston 500 through the upper connection member 610, the vertical connection member 630, the valve 640, and the lower connection member 620.

Furthermore, the oil rapidly moves through the cylinder unit 300, the connection members 610, 620, and 630, and the valve 640, thereby achieving easy control together with accurate operation.

Subsequently, the lever 650 of the valve unit 600 is operated in the reverse direction such that the value mounting hole 642 interrupts communication between the lower connection member 620 and the vertical connection member 630.

As is apparent from the above description, the autonomous hydraulic expansion and contraction apparatus is easily operated so as to have an expansion and contraction length corresponding to that of the expansion and contraction equipment through simple manipulation of the lever and to withstand a high load from the expansion and contraction equipment using oil stored in the cylinder unit and the connection members.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An autonomous hydraulic expansion and contraction apparatus comprising:
   - a fixing unit (200) having a fixing support member formed at an end of a lower part thereof;
   - a cylinder unit (300) mounted to an upper part of the fixing unit (200), the cylinder unit (300) being provided therein with a receiving space (310) for storing oil;
   - a support unit (400), one side of which is inserted and mounted into the receiving space (310) in the cylinder unit (300) and the other side of which is located outside the cylinder unit (300), an expansion and contraction fixing member (410) being mounted to an end of the other side of the support unit (400), the support unit (400) being configured to move upward or downward in response to movement of the oil stored in the receiving space (310);
   - a piston unit (500) comprising a barrier type sealing part mounted to an end of the support unit (400), which is inserted into the receiving space (310), the barrier type sealing part being configured to move in response to movement of the support unit (400);
   - a valve unit (600) disposed at an outer surface of the cylinder unit (300), the valve unit (600) being provided at upper and lower parts thereof with upper and lower connection members (610, 620), which communicate with the cylinder unit (300), a vertical connection member (630) being mounted to ends of the upper and lower connection members (610, 620), a valve (640) having a value mounting hole (642) for allowing or interrupting communication between the lower connection member (620) and the vertical connection member (630) in response to manipulation of a lever (650) being mounted in a connection portion of the connection members (620, 630); and
   - oil supply parts (670) mounted to the ends of the upper and lower connection members (610, 620) for supplying oil into the cylinder unit (300), wherein
   - the upper and lower connection members (610, 620) are coupled to the cylinder unit (300) through cylinder coupling holes (330), each of the cylinder coupling holes (330) having an inclined guide surface (332) and an inclined support surface (334) for allowing the smooth movement of oil and preventing concentration of a load during the movement of the oil, the inclined guide surface (332) and the inclined support surface (334) having different angles of inclination.

2. The autonomous hydraulic expansion and contraction apparatus according to claim 1, wherein at least one auxiliary valve (680) for preventing an overload from being applied to the valve unit (600) is selectively mounted in the lower connection member (620).

* * * * *